United States Patent [19]
Bookman et al.

[11] Patent Number: 5,761,673
[45] Date of Patent: Jun. 2, 1998

[54] METHOD AND APPARATUS FOR GENERATING DYNAMIC WEB PAGES BY INVOKING A PREDEFINED PROCEDURAL PACKAGE STORED IN A DATABASE

[75] Inventors: Matthew Bookman, Los Gatos; John Francis Haverty, La Honda; Magnus Mard Lonnroth, Redwood City; Teresita Katrina Rodriquez Montinola; Joseph Charles Pistritto, both of Belmont, all of Calif.

[73] Assignee: Oracle Corporation, Redwood Shores, Calif.

[21] Appl. No.: 594,686

[22] Filed: Jan. 31, 1996

[51] Int. Cl.[6] .................................................. G06F 17/30
[52] U.S. Cl. ........................... 707/104; 707/10; 395/680
[58] Field of Search .............................. 395/793, 603, 395/610, 184.01, 682, 356, 733, 357, 617, 680; 707/10, 104

[56] References Cited

U.S. PATENT DOCUMENTS

| | | | |
|---|---|---|---|
| 5,530,852 | 6/1996 | Meske, Jr. et al. | 395/610 |
| 5,537,586 | 7/1996 | Amram et al. | 395/603 |
| 5,572,643 | 11/1996 | Judson | 395/793 |
| 5,701,451 | 12/1997 | Rogers et al. | 707/104 |
| 5,710,918 | 1/1998 | Lagarde et al. | 395/680 |

OTHER PUBLICATIONS

"Oracle Version 7", Computergram International, Jun. 17, 1992.

"Oracle Rides the Internet with Web", Computergram International, Feb. 10, 1995.

"Sun Java, Netscape Livescript Married as Javascript", Computergram International, Dec. 1995.

Marshall et al. "Industry Lines Up for Java—Vendors Set Stage for Dynamic", Commications Week, Dec. 1995.

"Oracle Unveils Oracle Websystem Internet Line", Computergram International, Nov. 1995.

Marshall, Martin "Sybase Sites to Get Web Links", Communciations Week, Nov. 1995.

(List continued on next page.)

*Primary Examiner*—Thomas G. Black
*Assistant Examiner*—Charles L. Rones
*Attorney, Agent, or Firm*—Blakely, Sokoloff, Taylor & Zafman LLP

[57] ABSTRACT

A method and apparatus for generating dynamic Web pages is disclosed. Specifically, the present invention claims a method and apparatus for generating dynamic Web pages on a Web server by invoking and executing predefined procedural packages stored in a database. The claimed invention receives an object request on the Web server and activates a Web agent on the Web server based on the object request. The Web agent invokes and executes the predefined procedural package to retrieve data from a data repository, and then formats the retrieved data as HTML output.

7 Claims, 4 Drawing Sheets

OTHER PUBLICATIONS

Karpinski, Richard "Oracle Readies Web Initiative–Businesses Can Tie Their Databases Directly to the Web", Interactive Age, n207, p. 1, Jan. 30, 1995.

"Hypercard–Based Oracle Card for Macintosh, Windows 3.0", Computergram International, Jan. 1991.

Karpinski, Richard "Web–Based Help Desks Debut", Communications Week, Oct. 1995.

"Next Leaps Aboard the Internet with Webobjects", Computergram International, Aug. 15, 1905.

Clinton et al. "Intranet Tools: Coprorations Seek Internal Web Applications—and Major Vendors are Happy to Help", Informationweek, n552, p14(2), Nov. 6, 1992.

Nash, Kim S. "Web Browser Makers Follw Modular Trend", News, Apr. 29, 1996.

"Netscape & Sun Announce Javascript", Newsbytes, Dec. 4, 1995.

"Oracle Challlenges Netscape with Free Powerbrowser", Computergram International, Dec. 1995.

"Oracle Set Powerbrowser", Computergram International, Dec. 1995.

"Oracle Begins Internet Initiative:Multimedia, Hypertext Development Tools", Seybold Report on Desktop Publishing, v9, n7, p27(1), Mar. 6, 1995.

Menefee, Craig "Oracle Intros Database Products", Newsbytes, Jan. 23, 1995.

"Sybase: Sybase Introduces Powersite Enterprise Web Development Environment", M2 Communications, Dec. 1997.

"ObjectShare IntroducesjKit/Grid; First Offering in a New Line of Advanced Java Components; Extensible New Software Provides Powerful Java Classes for Grids, Tables and More; Advanced Component Automatically Reacts to Data Changes", Buisness Wire, pp. 101, Oct. 1996.

METHOD AND APPARATUS FOR GENERATING DYNAMIC WEB PAGES BY INVOKING A PREDEFINED PROCEDURAL PACKAGE STORED IN A DATABASE

FIELD OF THE INVENTION

The present invention relates to the field of Internet server technology. Specifically, the present invention relates to a method and apparatus for generating dynamic Web pages.

DESCRIPTION OF RELATED ART

The World Wide Web ("the Web") represents all the computers on the Internet that offer users access to information and documentation on the Internet via interactive "hypermedia." Hypermedia describes a document in which "hypertext links" are used to connect any combination of graphics, audio, video and text in a non-linear, non-sequential manner. Words, phrases and icons in documents become links that enable a user to jump at will to a new location in a document or to a new document, either on the same computer or on a different computer on the Web.

Hypermedia authors use a special software language known as HyperText Markup Language (HTML) to create these hyperlinks and to create and format these hypermedia documents. These hypermedia documents are generally referred to as "Web pages" and are stored on Web servers as text files, containing the information encoded in HTML. The Web pages can also be stored in databases, in database tables. Examples of currently available Web servers include NETSITE™ from NETSCAPE™, CERN™ from the European Particle Physics Laboratory and NCSA™ from the National Center for Supercomputing Applications (NCSA™) at the University of Illinois, Urbana-Champaign.

Web client machines running "Web browsers" can access Web pages stored on Web servers via a communications protocol known as HyperText Transport Protocol (HTTP). Web browsers are software interfaces that run on Web clients to allow access to Web servers via a simple user interface. A variety of Web browsers are available today, the most popular ones being "NAVIGATOR™" which can be obtained from NETSCAPE™, and "MOSAIC™" which can be obtained from NCSA™.

A Web browser allows a Web client to request a particular hypermedia document from a Web server by specifying a Universal Resource Locator (URL). An URL is a "Web address" that identifies the Web page and its location on the Web. When the appropriate Web server receives the URL, the server locates the document corresponding to the requested URL and, if required, takes action to create HTML output.

Although Web pages were traditionally stored as static files on the Web server operating system, today Web pages can also be generated dynamically using the Common Gateway Interface (CGI). CGI is a standard interface for running external programs on a Web server. It allows Web servers to create dynamic documents when the server receives a request from the Web browser. When the Web server receives a request for a dynamic document, the Web server executes the appropriate CGI script and transmits the output of the execution back to the requesting Web browser. The Web browser does not differentiate between static and dynamic documents. It simply displays the output of the request.

With CGI, it is becoming increasingly common to extract dynamic information from databases as well as from text files. As Web sites continue to grow, storing Web pages as text files in the operating system becomes unwieldy and inefficient. Databases provide significant advantages over traditional file systems for storage of large amounts of information. Database capabilities may also be exploited in other ways to increase the efficiency of generating dynamic Web pages.

SUMMARY OF THE INVENTION

It is therefore an object of the present invention to provide a more efficient method and apparatus for generating dynamic Web pages. Specifically, the present invention discloses a method and apparatus for generating dynamic Web pages on a Web server by invoking and executing predefined procedural packages stored in a database.

The claimed invention comprises the steps of receiving an object request on the Web server, activating a Web agent on the Web server based on the object request, the Web agent invoking the predefined procedural package, executing the predefined procedural package to retrieve data from a data repository, and formatting the retrieved data as HTML output.

Other objects, features and advantages of the present invention will be apparent from the accompanying drawings and from the detailed description.

DETAILED DESCRIPTION OF THE PREFERRED EMBODIMENT

The present invention relates to a method and apparatus for generating dynamic Web pages on a Web server. Specifically, the present invention discloses a Web agent for generating dynamic Web pages by invoking and executing procedural packages that are stored in a database. A procedural package, for the purposes of this invention, includes procedural blocks such as Oracle™ Corporation PL/SQL™ blocks. It will, however, be apparent to one of ordinary skill in the art that other types of procedural packages may also be utilized. In the following detailed description, numerous specific details are set forth in order to provide a thorough understanding of the present invention. It will be apparent to one of ordinary skill in the art that these specific details need not be used to practice the present invention. In other instances, well-known structures, interfaces, and processes have not been shown in detail in order not to unnecessarily obscure the present invention.

Figure 1:
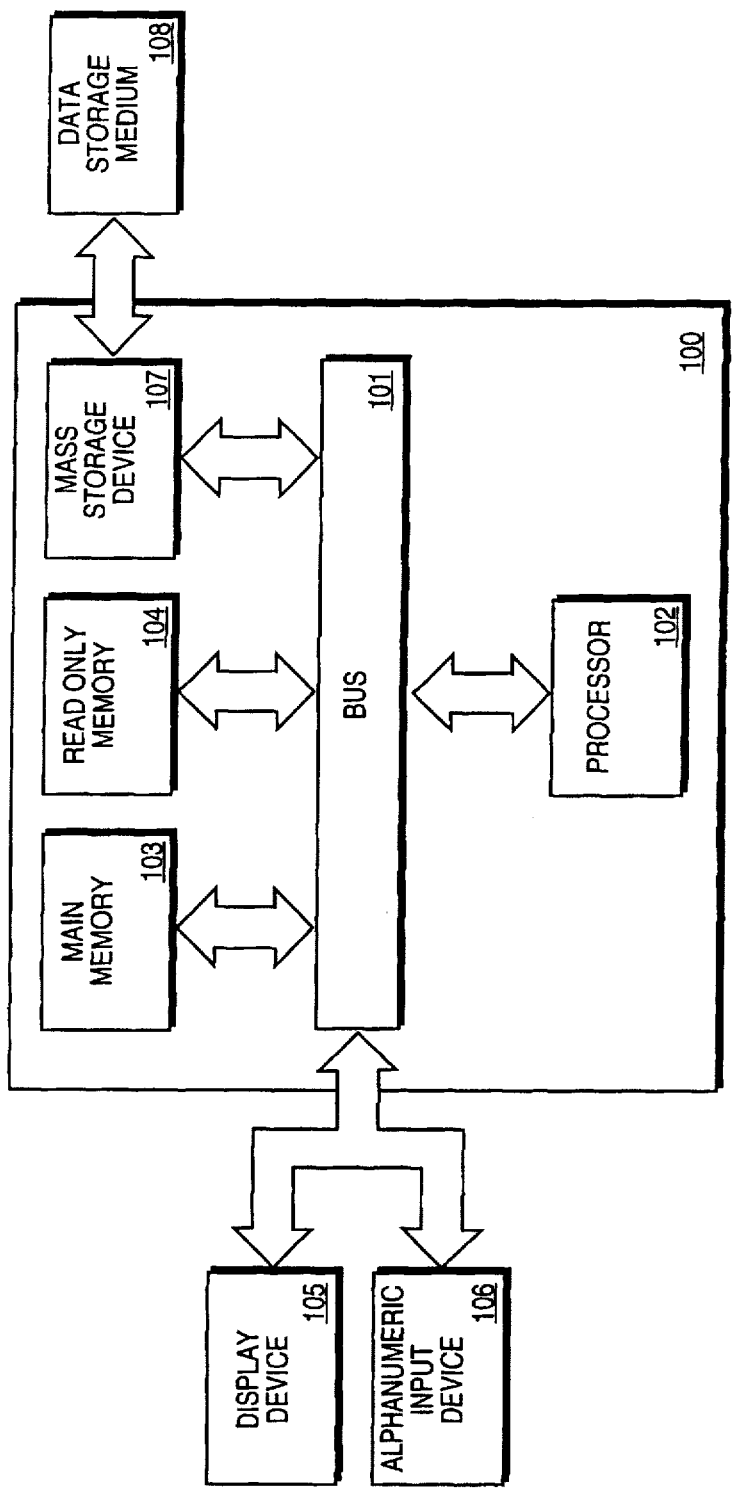
FIG. 1 illustrates a typical prior art computer system.

FIG. 1 illustrates a typical computer system 100 in which the present invention operates. The preferred embodiment of the present invention is implemented on a SUN™ Workstation manufactured by SUN MICROSYSTEMS™ of Mountain View, Calif. Alternate embodiments may be implemented on an IBM™ Personal Computer manufactured by IBM Corporation of Armonk, N.Y. or a MACINTOSH™ computer manufactured by APPLE™ Computer, Incorporated of Cupertino, Calif. It will be apparent to those of ordinary skill in the art that other computer system architectures may also be employed.

In general, such computer systems as illustrated by FIG. 1 comprise a bus 101 for communicating information, a processor 102 coupled with the bus 101 for processing information, main memory 103 coupled with the bus 101 for storing information and instructions for the processor 102, a read-only memory 104 coupled with the bus 101 for storing static information and instructions for the processor 102, a display device 105 coupled with the bus 101 for displaying information for a computer user, an alphanumeric input device 106 coupled with the bus 101 for communicating information and command selections to the processor 102, and a mass storage device 107, such as a magnetic disk and associated disk drive, coupled with the bus 101 for storing information and instructions. A data storage medium 108 containing digital information is configured to operate with data storage device 107 to allow processor 102 access to the digital information on data storage medium 108 via bus 101. In addition, a CD-ROM drive (not shown) may also be used for the storage of high resolution images for display on the display device 105.

Processor 102 may be any of a wide variety of general purpose processors or microprocessors such as the SPARC™ manufactured by SUN MICROSYSTEMS™ the MOTOROLA™ 68040 or POWERPC™ brand microprocessor manufactured by MOTOROLA™ Corporation or the PENTIUM® microprocessor manufactured by INTEL® Corporation. It will be apparent to those of ordinary skill in the art, however, that other varieties of processors may also be used in a particular computer system. Display device 105 may be a liquid crystal device, cathode ray tube (CRT), or other suitable display device. Mass storage device 107 may be a conventional hard disk drive, floppy disk drive, or other magnetic or optical data storage device for reading and writing information stored on a hard disk, a floppy disk, a magnetic tape, or other magnetic or optical data storage medium.

In general, processor 102 retrieves processing instructions and data from a data storage medium 108 using data storage device 107 and downloads this information into random access memory 103 for execution. Processor 102, then executes an instruction stream from random access memory 103 or read-only memory 104. Command selections and information input at alphanumeric input device 106 are used to direct the flow of instructions executed by processor 102. Equivalent input device 106 may also be a pointing device such as a conventional mouse or trackball device. The results of this processing execution are then displayed on display device 105.

The preferred embodiment of the present invention is implemented as a software module, which may be executed on a computer system such as computer system 100 in a conventional manner. Using well known techniques, the application software of the preferred embodiment is stored on data storage medium 108 and subsequently loaded into and executed within computer system 100. Once initiated, the software of the preferred embodiment operates in the manner described below.

Figure 2:
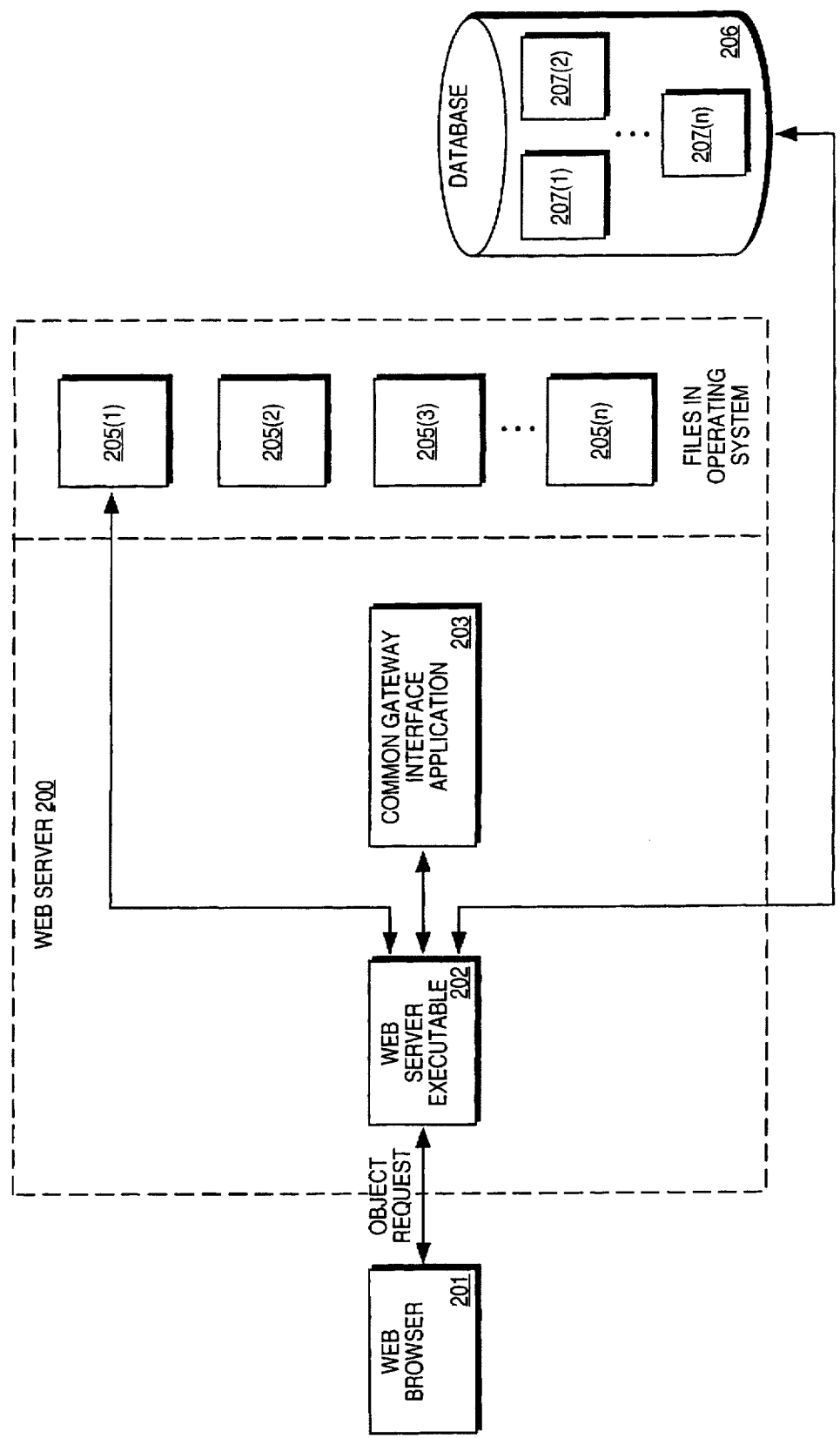
FIG. 2 is an illustration of a typical prior art Web server environment.

FIG. 2 illustrates a typical prior art Web server environment, containing conventional objects. An object includes HTML files, GIF or JPEG files, any files supported by Web browsers and Common Gateway Interface (CGI) scripts. Each object has an attribute associated with it that identifies the type of object. For example, a AVI extension on a Web object indicates that the object is a Microsoft™ Video object. Web browser 201 interacts with Web server 200 via Web server executable 202. Web browser 201 makes an object request from Web server executable 202. Web server executable 202 locates the object either in a text file on the operating system of Web server 200, or a table in database 206, based on the object request URL. If the object is an HTML file, a GIF file or other files supported by Web browsers, Web server executable 202 retrieves and returns object 205(1) or 207(1) to Web Browser 201. If the object requested is a CGI script, however, CGI script 203 will generate dynamically created HTML output and transfer the output to Web server executable 202, and back to requesting Web browser 201.

The present invention discloses a method and apparatus for generating dynamic Web pages on a Web server by invoking and executing procedural packages such as ORACLE™ Corporation, PL/SQL™ that are stored in a database. For the purposes of this invention, a "database" is defined as an actual database or any repository that can be made to look like a database to the Web server. Procedural packages provide an object oriented approach to database programming. A package consists of a public header declaration and a private body containing the definitions. The public package header contains function and procedure prototypes as well as other procedural objects such as variables, cursors and exceptions. The private package body contains definitions for objects declared in the package header as well as private functions, procedures, cursors, variables and exceptions, which are only accessible from other functions and procedures in the package.

Each procedure or function may have zero or more parameters and each parameter may be defined as being read-only or writeable by the program unit. One advantage of packaging functions and procedures is an object oriented feature that allows multiple versions of the same function or procedure, with different "signatures." Signatures in this context are parameter lists which can differ in datatype and/or quantity. This feature greatly simplifies the coding effort for developers because they can use the same procedure for different types of data. It also improves code readability and makes code less prone to break when, for example, datatypes in tables are changed. Generating dynamic Web pages using procedural packages also benefits from the simple programming involved in creating procedural packages as opposed to traditional CGI scripts.

A virtual path is the pathname pointing to an HTML document presented as if it were located in the file system rather than in the database. The Web server maps the virtual path to the actual path based on a configuration file. The HTML document may be in a directory on the file system or in the database. Use of this virtual pathname ensures that the actual location of the HTML document will be transparent to a client Web browser that requests the document. The Web browser will be able to use the request an HTML document without knowing whether it is attempting to retrieve the HTML document from the file system or a database. The Web agent takes advantage of two special features available in all Web servers namely the ability to pass extra PATH information after the name of a CGI executable, and the ability to map virtual directories to the physical file system.

Figure 3:
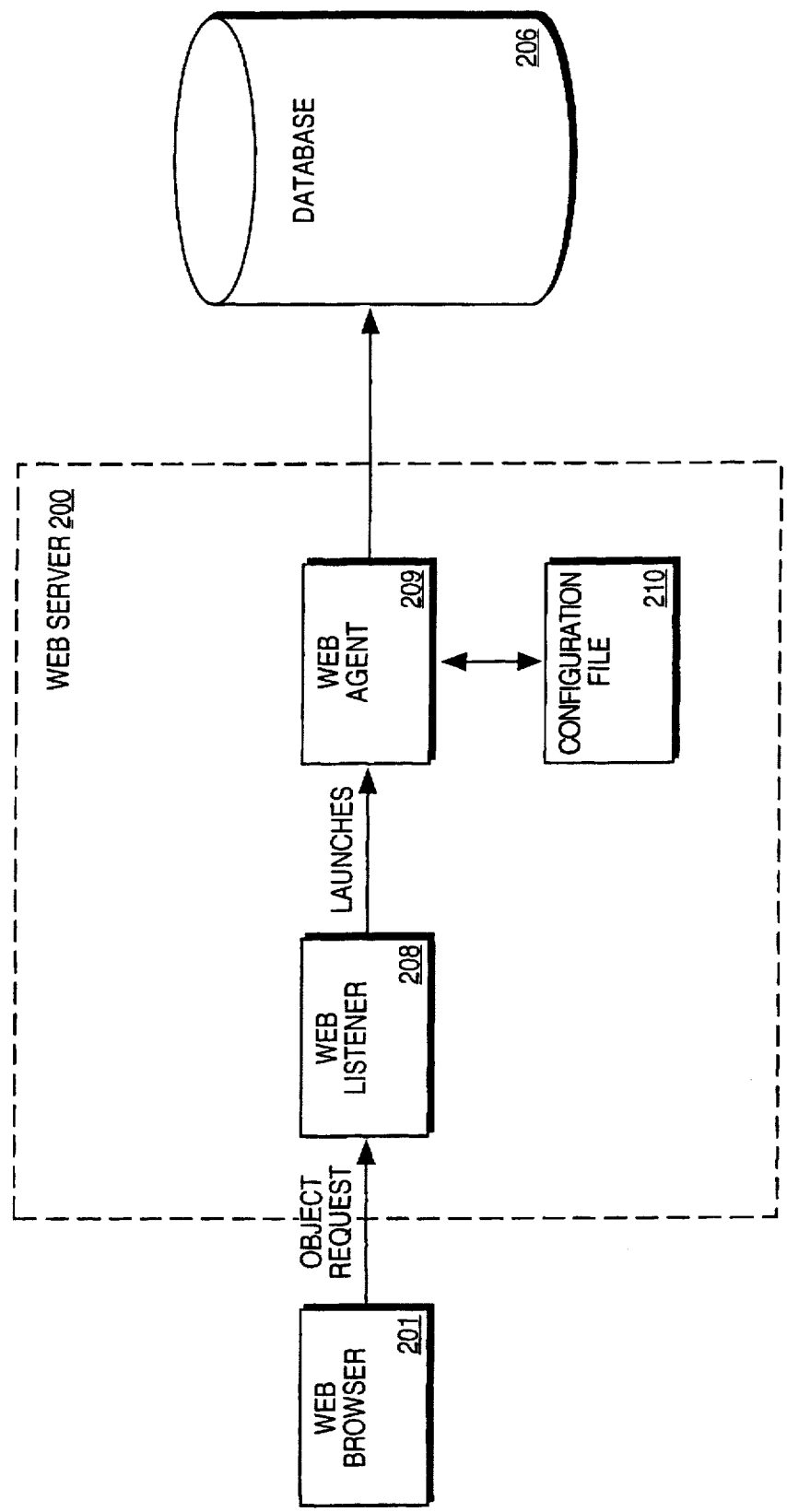
FIG. 3 illustrates the interaction between the Web browser, the Web listener, the Web agent and the database, as claimed in the preferred embodiment of the present invention.

FIG. 3 illustrates the interaction between the Web browser 201, Web listener 208, Web agent 211 and Database 206, in the preferred embodiment of the presently claimed invention. For clarity, Database 206 is illustrated as residing at a different location from Web server 200. It will be apparent to one of ordinary skill in the art, however, that Database 206 may reside either on the same computer as Web Server 200 or on a different computer.

Web browser 201 first makes an object request from Web listener 208 on Web Server 200. For example, if the object request specifies URL http://nhl.oracle.com/hr/owa/fireemp, the following actions will occur. The first part of the URL, http://nhl.oracle.com identifies the Web server 200. The object request will therefore be directed from Web browser 201 to Web server 200. Web listener 208 on Web server 200 receives the object request and examines the rest of the URL. /hr/owa, the first portion of the address, is defined on the Web server as a CGI application with a virtual path pointing to a directory containing Web agent 209. Web listener 208 launches Web agent 209. The preferred embodiment of the present invention implements the Web agent as an Oracle Call Interface program. It will be apparent to one of ordinary skill in the art, however, that any interface program that is similar to the Oracle Call Interface may be used to implement Web agent 209.

After activation, Web agent 209 examines the portion of the URL that precedes "owa." In this example, Web agent 209 finds "/hr" and uses this name to determine which database service to use. A list of various database services will be stored on Web server 200, in configuration file 210, each service providing a list of userids and passwords for logging into Database 206. Once Web agent 209 determines the appropriate userid and password to use for the database service, it logs into Database 206. Web agent 209 then examines the URL to determine what follows "owa." In the example above, Web agent 209 finds "fireemp" and uses that to locate the predefined procedural package to execute. In the preferred embodiment of the presently claimed invention, "fireemp" is a PL/SQL package stored in an Oracle7™ database. It will be apparent to one of ordinary skill in the art, however, that other types of procedural packages and databases may also be utilized.

Web agent 210 then executes "fireemp" which retrieves data from Database 206. Although in the preferred embodiment of the claimed invention, the data is retrieved from Database 206, it will be apparent to one of ordinary skill in the art that the procedural package "fireemp" can also retrieve data from alternate data repositories. The retrieved data is then formatted with HTML tags. The formatting information may be specified in PL/SQL procedure "fireemp." Alternatively, the user can include in PL/SQL procedure "fireemp" a call to a standard set of PL/SQL packages called HTP (HyperText Procedure) and HTF (HyperText Function). HTP and HTP automatically generate HTML tags. The formatted output is then returned to requesting Web browser 201.

Figure 4:
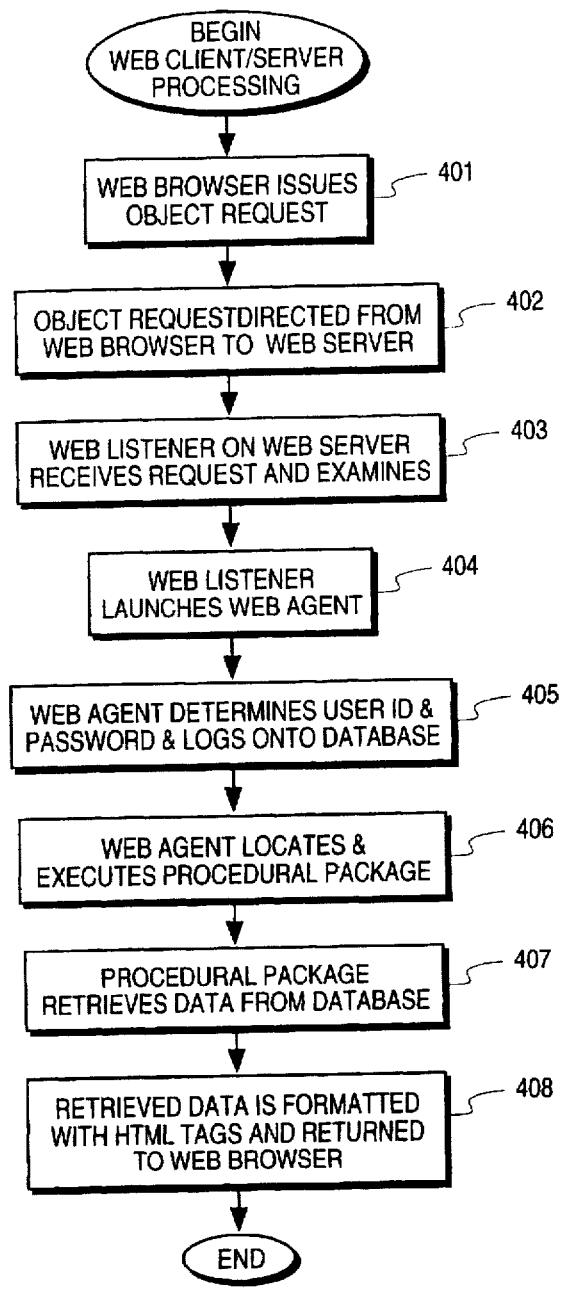
FIG. 4 illustrates the preferred embodiment of the presently claimed invention, in block diagram form.

FIG. 4 illustrates the preferred embodiment of the presently claimed invention, in block diagram form, using the same example as above. The Web browser issues an object request having URL http://nhl.oracle.com/hr/owa/fireemp in processing block 401. The object request is then directed from Web browser to Web server in processing block 402. The Web listener on the Web server receives the object request and examines the rest of the URL in processing block 403. /hr/owa, the first portion of the address, is defined on the Web server as a CGI application with a virtual path pointing to a directory containing Web agent. In processing block 404, the Web listener launches the Web agent "owa" in the directory corresponding to virtual path /hr. After activation, in processing block 405, the Web agent determines an appropriate userid and password and logs into the database. The Web agent then locates and executes the procedural package "fireemp" in procedural package 406. The procedural package retrieves data from the database in procedural block 407. The retrieved data is then formatted with HTML tags and returned to requesting the Web browser in procedural block 408.

Thus, a method and apparatus for generating dynamic Web pages on a Web server using predefined procedural packages stored in a database is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

We claim:

1. A Web agent for generating dynamic Web pages comprising:

means for invoking a predefined procedural package stored in a database;

means for executing the predefined procedural package to retrieve data from a data repository; and means for formatting the retrieved data to conform with a selected format.

2. A computer-readable medium having stored thereon a plurality of sequences of instructions, the plurality of sequences of instructions including sequences of instructions which, when executed by a processor, cause the processor to perform the steps of:

receiving a request on a Web server;

activating a Web agent on the Web server based on the request, the Web agent invoking a predefined procedural package stored in a database;

executing the predefined procedural package to retrieve data from a data repository; and formatting the retrieved data to conform with a selected format.

3. A computer-implemented method for generating dynamic Web pages on a Web server using a predefined procedural package stored in a database, the computer-implemented method comprising the steps of:

receiving a request on the Web server;

activating a Web agent on the Web server based on the request, the Web agent invoking the predefined procedural package stored in the database;

executing the predefined procedural package to retrieve data from a data repository; and formatting the retrieved data to conform with a selected format.

4. The computer-implemented method as described in claim 3 wherein the step of executing the predefined procedural package to retrieve data from the data repository retrieves data from the database.

5. The computer-implemented method as described in claim 4 wherein the step of activating the Web agent further includes the step of identifying a database service.

6. The computer-implemented method as described in claim 5 further including the step of logging into the database using the database service.

7. The computer-implemented method as described in claim 3 wherein the step of formatting the retrieved data is performed by the predefined procedural package.

* * * * *